United States Patent [19]

Strong et al.

[11] Patent Number: 4,889,517
[45] Date of Patent: Dec. 26, 1989

[54] OVERLAPPING RASP BAR ROTOR FOR AXIAL FLOW COMBINES

[75] Inventors: Russell W. Strong, Brugge; Eric P. J. van Quekelberghe, Damme, both of Belgium

[73] Assignee: Ford New Holland, Inc., New Holland, Pa.

[21] Appl. No.: 348,344

[22] Filed: May 5, 1989

[51] Int. Cl.$^4$ ............................................. A01F 12/22
[52] U.S. Cl. ........................................ 460/66; 460/71
[58] Field of Search ...................... 460/59, 63, 66, 71, 460/75, 76, 80, 109; 56/14.5, 14.6

[56] References Cited

U.S. PATENT DOCUMENTS

| | | | |
|---|---|---|---|
| 4,178,943 | 12/1979 | West | 460/80 |
| 4,362,168 | 12/1982 | Hengen et al. | 460/66 |
| 4,422,463 | 12/1983 | West | 460/71 X |
| 4,505,279 | 3/1985 | Campbell et al. | 460/66 |

FOREIGN PATENT DOCUMENTS 0216060  7/1986  European Pat. Off. .

Primary Examiner—Thuy M. Bui
Attorney, Agent, or Firm—Larry W. Miller; Frank A. Seemar; Darrell F. Marquette

[57] ABSTRACT

An axial flow harvesting machine having at least one generally cylindrical rotor rotatably mounted within a casing and operable, in conjunction with the casing, to thresh and separate grain from straw material, and a plurality of threshing elements provided around the periphery of the rotor is disclosed wherein the threshing elements are staggered along the axis of the rotor and configured for optimum crop flow along the rotor. The threshing elements are also arranged to overlap axially, and preferably also circumferentially, with respect to the associated rotor.

8 Claims, 7 Drawing Sheets

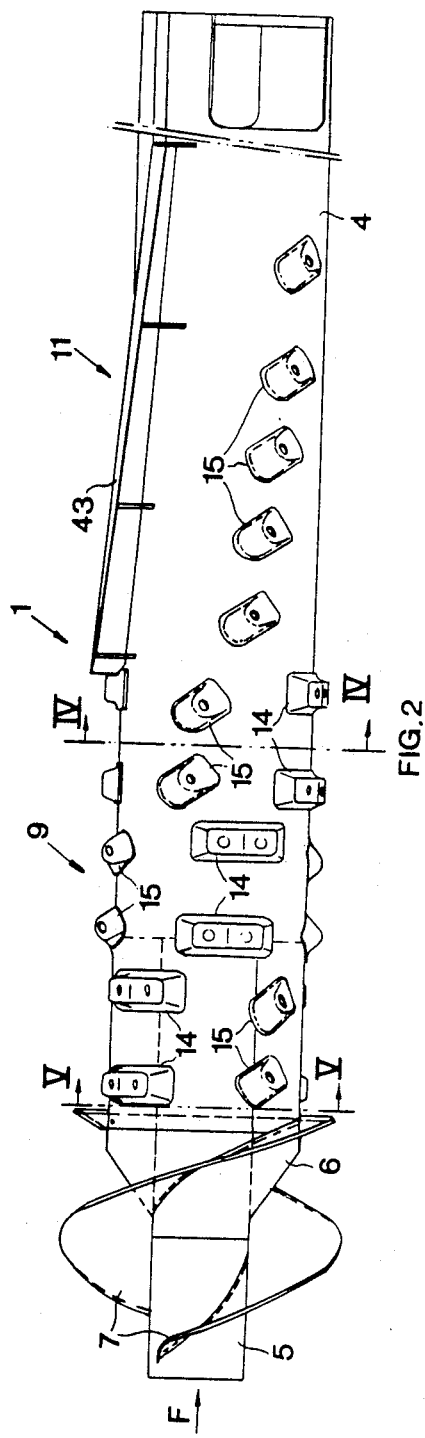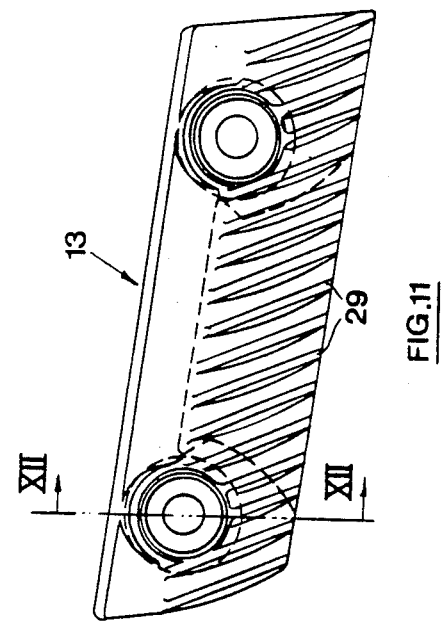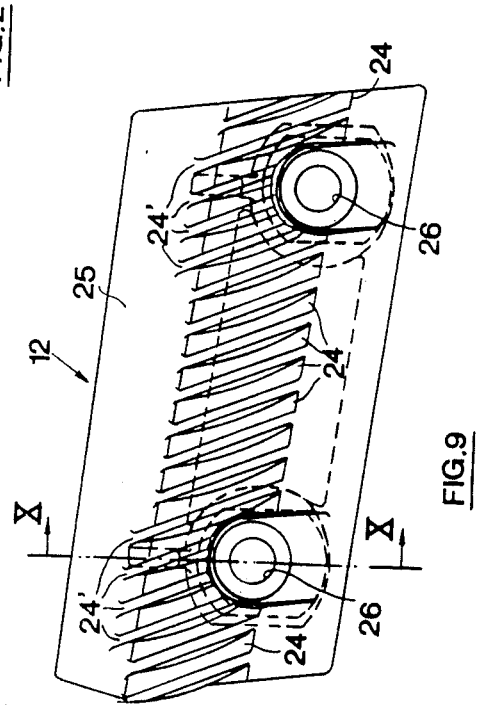

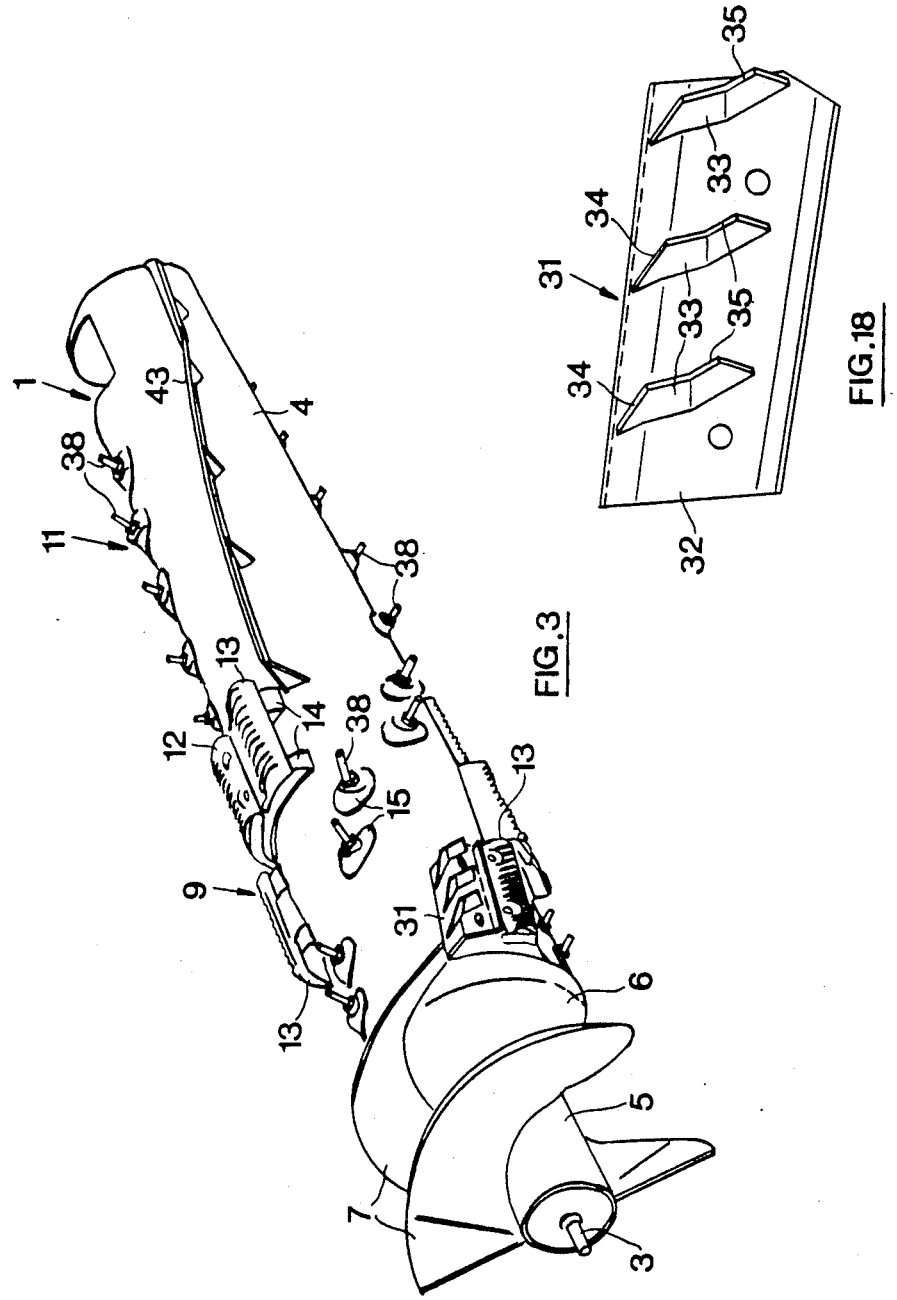

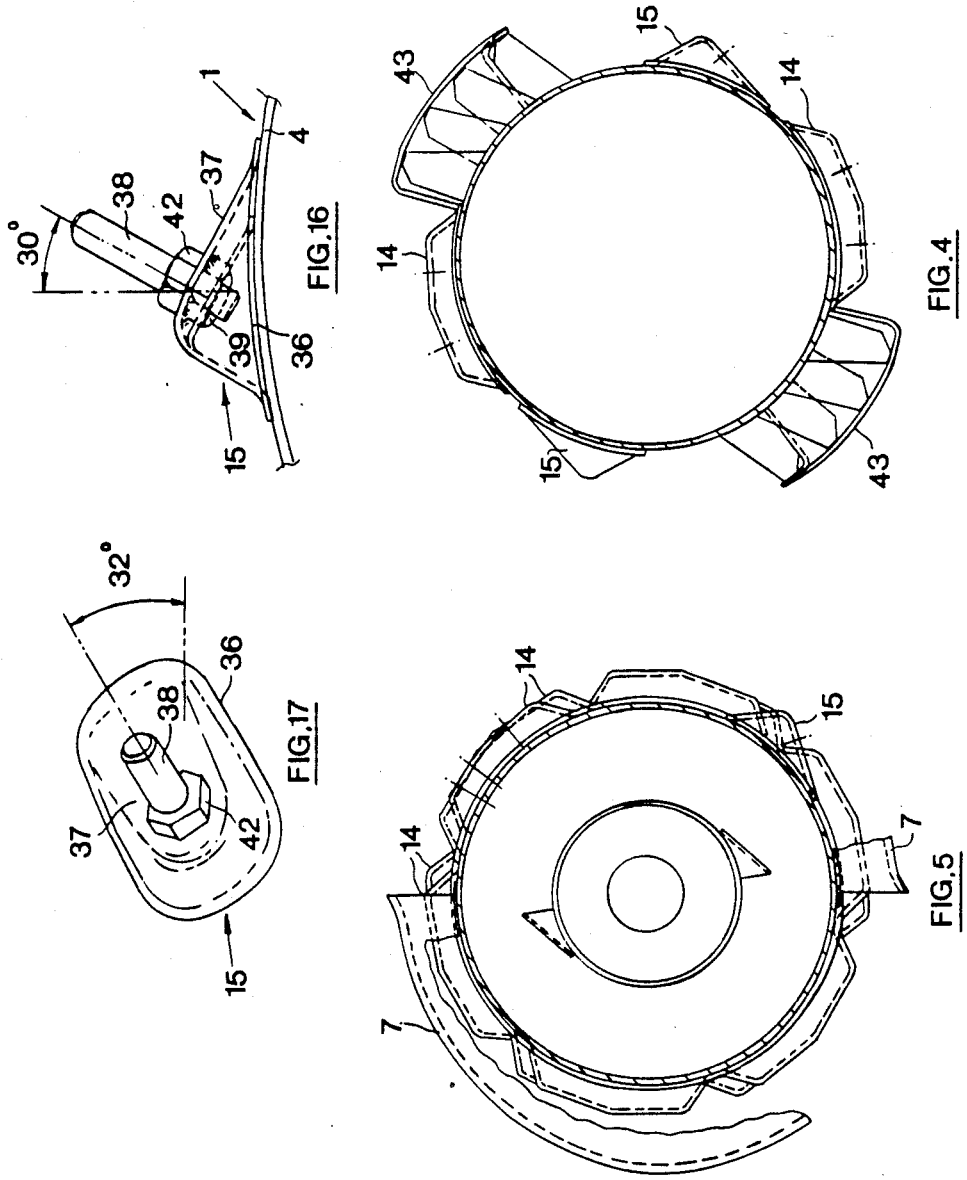

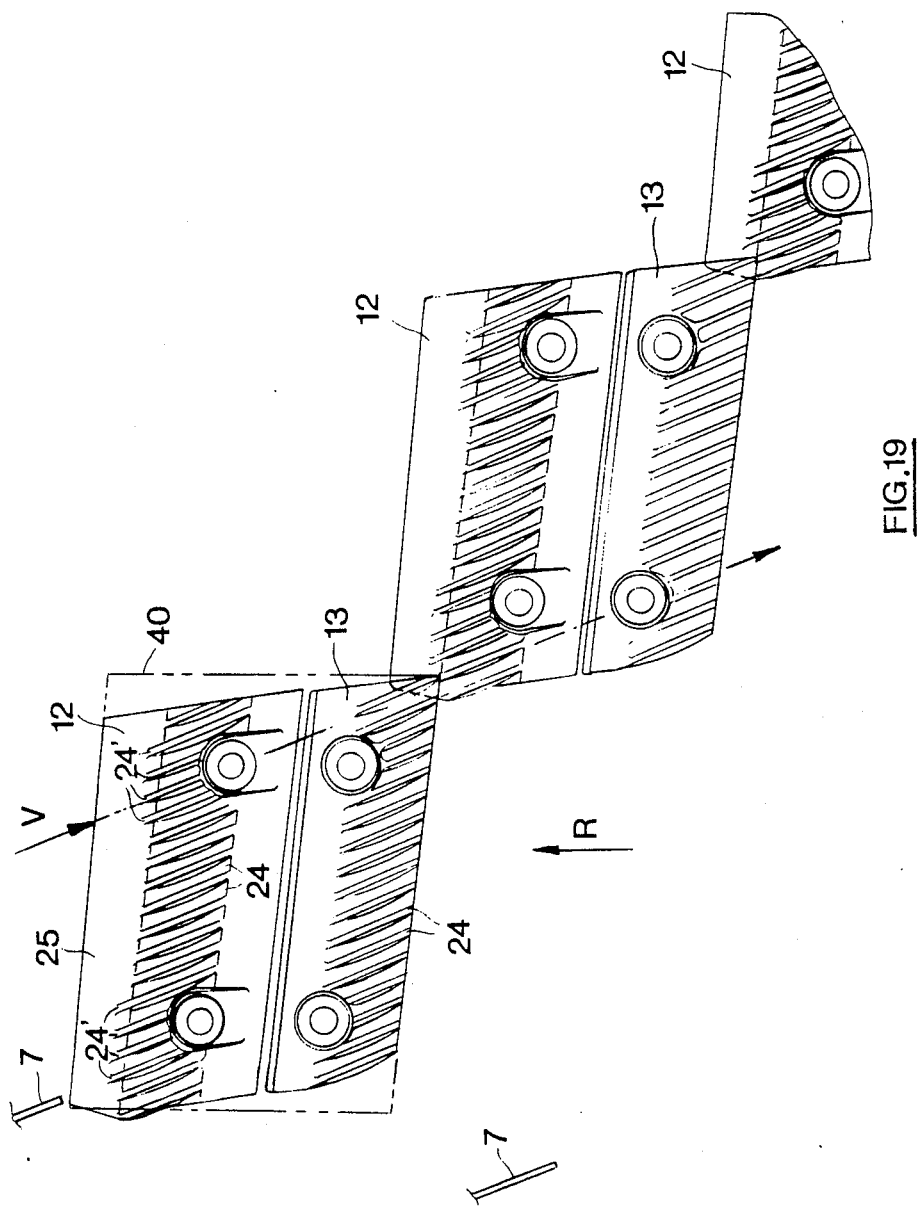

4,889,517

OVERLAPPING RASP BAR ROTOR FOR AXIAL FLOW COMBINES

BACKGROUND OF THE INVENTION

This invention relates generally to axial flow harvesting machines, and more particularly, to an overlapping rasp bar rotor configuration for axial flow combines.

In conventional combine harvesters, crop material is fed between a threshing cylinder and an associated concave, whereby it is threshed over a comparatively short distance, a typical concave extending over an arc of about 100°. In axial flow machines, crop material is subjected to a much longer threshing and separating action than in a conventional machine of comparable size and, therefore, the efficiency of axial flow machines is greater because grain losses are reduced.

Nevertheless, there are problems associated with axial flow machines which mitigate against this basic advantage. For example, the power requirement of an axial flow machine is greater than that of a comparable conventional machine due to the sustained threshing and separating action and difficulties can be experienced when a given machine is used to harvest different types of crop and in different conditions of crop. Clearly, it is highly desirable to provide a basic machine which can be adopted with ease to handle different types and conditions of crop. It is essential to keep grain losses to an acceptable minimum and also to achieve a smooth flow of crop material through the threshing and separating mechanisms. In the latter respect, if an amount of crop material or a piece of foreign matter ceases moving through the threshing and separating sections, a major obstruction can soon accumulate resulting in jamming or plugging of the rotor. The consequences of which can be serious in terms of down-time of the machine.

One solution to maintaining a smooth flow of crop material is a staggering of the crop threshing means, such as rasp bars, axially of a rotor, such as described in U.S. Pat. No. 4,505,279, granted to S. J. Campbell, et al on Mar. 19, 1985. While this rotor configuration provided improved performance, great operational efficiencies are still desirable.

SUMMARY OF THE INVENTION

It is an object of the present invention to provide an axial flow harvesting machine which provides for a smoother flow of crop material and thus improves the functional efficiency of the rotors.

According to the present invention there is provided an axial flow harvesting machine comprising at least one generally cylindrical rotor mounted within a casing and operable, in conjunction with the casing, to thresh and separate grain from straw material, and a plurality of threshing means provided around the periphery of the or each rotor and staggered axially thereof, characterised in that adjacent threshing means overlap axially of the associated rotor.

Preferably, adjacent threshing means are also arranged to overlap circumferentially of the associated rotor. The crop threshing means may be in the form of pairs of leading and trailing rasp bars with the trailing rasp bar of one pair overlapping axially and, where appropriate, circumferentially of the associated rotor, the leading rasp bar of the adjacent pair.

BRIEF DESCRIPTION OF THE DRAWINGS

An axial flow combine harvester in accordance with the present invention will now be described in greater detail, by way of example, with reference to the accompanying drawings, wherein:

FIG. 2 is a side view of one of two rotors of the combine harvester of FIG. 1 without any members for operating on the crop material shown mounted thereon;

FIG. 3 is a perspective view of the rotor of FIG. 2 showing members for operating on the crop material mounted thereon;

FIG. 4 is a section on the line IV—IV of FIG. 2;

FIG. 5 is a partial cross-sectional view taken along the line V—V of FIG. 2, showing portions of the rotor as seen in end view in the direction of arrow F;

FIG. 9 is a plan view of a leading rasp bar;

FIG. 11 is a plan view of a trailing rasp bar;

FIG. 16 is a side view of the mounting means of FIGS. 14 and 15 showing a crop thinning element mounted thereon;

FIG. 17 is a perspective view of FIG. 16;

FIG. 18 is a plan view of an alternative element for operating on crop material; and FIG. 19 is a detail to a larger scale of FIG. 6.

DETAILED DESCRIPTION OF THE PREFERRED EMBODIMENT

The terms "grain", "straw", and "tailings" are used principally throughout this specification for convenience and it is to be understood that these terms are not intended to be limiting. Thus "grain" refers to that part of the crop material which is threshed and separated from the discardable part of the crop material which is referred to as "straw". Incompletely threshed crop material is referred to as "tailings". Also the terms "forward", "rearward", "left", and "right", when used in connection with the combine harvester and/or components thereof are determined with reference to the direction of forward operative travel of the combine harvester but again, should not be construed as limiting.

Figure 1:
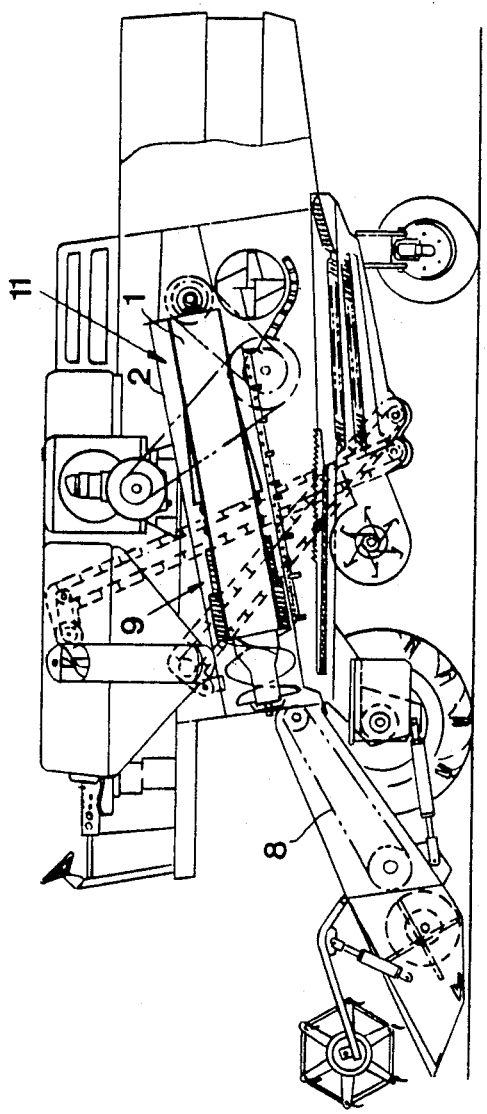
FIG. 1 is a diagrammatic side view of the combine harvester.

Turning now to FIG. 1 of the accompanying drawings, the basic machine is well known and is described, for example, in GB-A-1399601 the description of which is herein incorporated by reference. As described in GB-A-1399601, the combine harvester has a twin threshing and separating mechanism by way of right-hand and left-hand threshing and separating units each comprising a generally cylindrical rotor 1 mounted within a common, and generally correspondingly shaped, chamber 2. The inner surface of the chamber 2 is provided with helical fins in order to impart a helical and generally axial flow of crop material along the respective rotors 1 as is well known. Each rotor 1 is mounted for rotation on a forward and rearward stub shaft 3, of which only the forward stub shaft is shown in FIG. 3 of the drawings. The main body of each rotor 1 is a cylindrical tube 4 mounted on discs (not shown) supported on the respective stub shafts, and the forward end of each rotor is provided with an infeed section having a portion 5 of reduced diameter and a conical portion 6 which provides a transition between the portion 5 and the main body 4 of the rotor. A pair of auger flights 7 is provided at the infeed section 5, 6 of each rotor 1 which serves to transfer crop material from the top end of a crop conveyor 8 (FIG. 1) to the respective rotors 1.

Each rotor 1 has a threshing section 9 immediately following the infeed section 5, 6, and the threshing section is followed by a separating section 11. It is conventional to provide rasp bars in the threshing section of a rotor and separating bars differing from the rasp bars. The present rotors 1 are no exception to this and in order to provide for the provision of rasp bars 12 and 13 (seen generally in FIG. 3 and in greater detail in FIGS. 9–13) rasp bar mounts 14 are provided at predetermined positions around the periphery of the threshing section of each rotor 1 in the threshing section. The rasp bar mounts 14 are provided in pairs and further mounts 15 are also provided around the periphery of the rotor in predetermined positions both in the threshing section and the separating section of each rotor 1.

Figure 13:
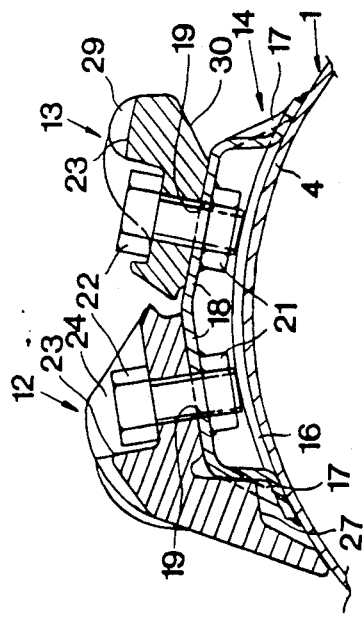
FIG. 13 is a section through part of the rotor of FIG. 2, showing a leading rasp bar and a trailing rasp bar mounted on common mounting means.
Figure 12:
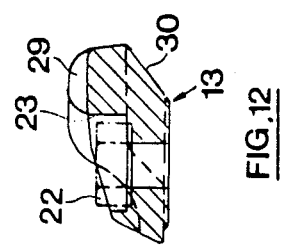
FIG. 12 is a section on line XII—XII of FIG. 11.
Figure 10:
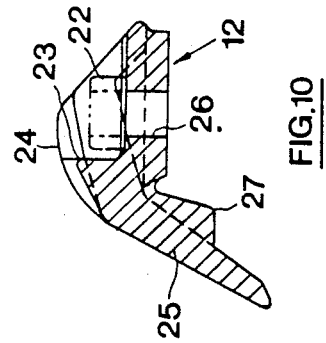
FIG. 10 is a section on the line X—X of FIG. 9.
Figure 7:
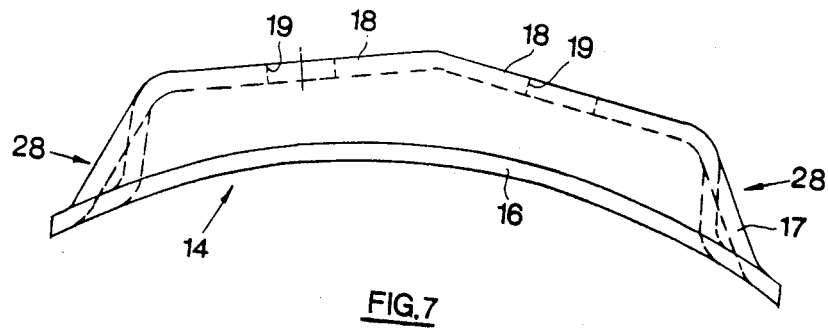
FIG. 7 is a side view of mounting means for rasp bars.
Figure 8:
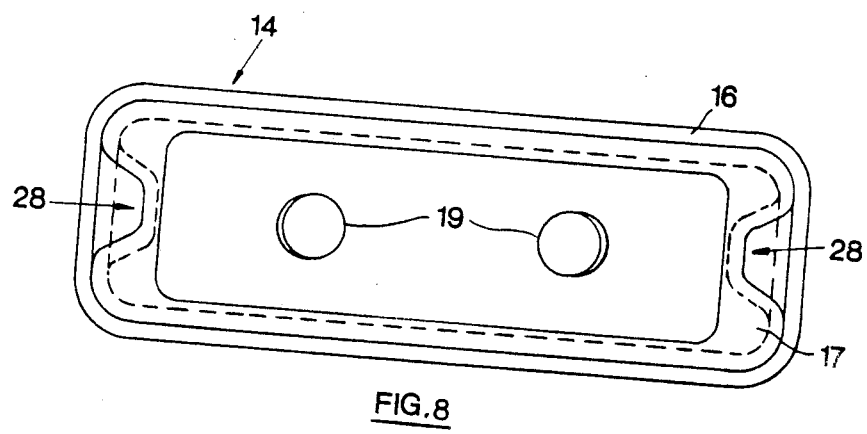
FIG. 8 is a plan view of FIG. 7.
Figures 14, 15:
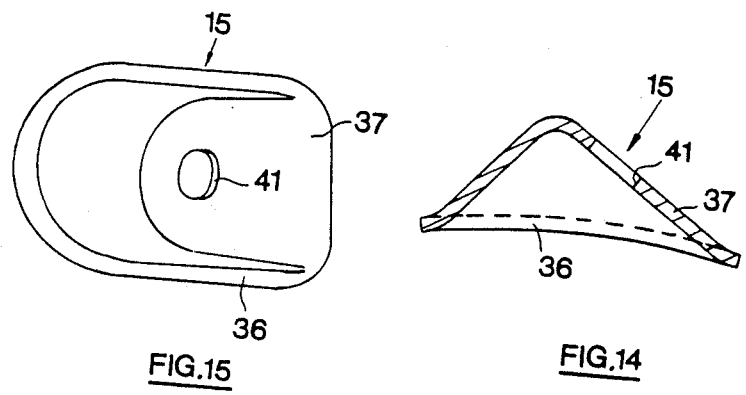
FIG. 14 is a cross sectional view of mounting means for a crop thinning element.
FIG. 15 is a plan view of the mounting means of FIG. 14.

Referring more specifically to FIG. 7, 8 and 13, each rasp bar mount 14 is preformed and is an elongated rectangle as seen in plan view and comprises an arcuate base 16 conforming to the periphery of the rotor on which each mount is secured by welding or other means. An actual rasp bar mounting member 17 is provided on the base 16 and has two inclined surfaces 18 which are apertured at 19. Weld nuts 21 are provided in alignment with each aperture 19 on the underside of each mounting surface 18. It will be seen that the overall height of each rasp bar mount 14 is relatively small (and less than the overall height of the rasp bars 12 and 13) so that each mount has a very low profile such that it will not interfere with the smooth flow of crop material relative to the rotor in use of the combine harvester even if no rasp bar is mounted thereon. In this respect, the corners of the mounting members 17 and bases 16 are rounded so as not to present any sharp edge to the crop material.

As previously mentioned, the rasp bar mounts 14 are provided in pairs and each pair may support a pair of rasp bars 12 and 13, the rasp bars 12 being leading rasp bars and the rasp bars 13 trailing rasp bars, with respect to the flow of crop material thereover which is indicated by arrow V in FIG. 19 with the direction of rotation of the rotor 1 being indicated by arrow R. The angle between the mounting surfaces 18 of each rasp bar mount 14 is 160° in the illustrated embodiment and is related to the diameter of the rotor used. Indeed, each inclined surface 18 is generally perpendicular to the corresponding radius of the rotor 1 drawn through the aperture 19 provided in said surface 18. The foregoing has been found to give a very satisfactory performance, without being critical however. The rasp bar mounts 14 of a given pair are welded or otherwise attached to each rotor main body 4 in an offset manner as seen in FIG. 2 of the drawings in order to incline the rasp bars 12 and 13 relative to the axis of each rotor 1 in order to assist in the helical movement of crop material around and along the rotor.

It should be noted that each rasp bar 12 and 13 is relatively deep compared to known rasp bars so as to compensate for the low profile (height) of the rasp bar mounts 14 in order that there is the optimal radial clearance between the rasp bars and the inner surfaces of the respective chambers 2. This combination of rasp bar and rasp bar mounts gives rise to one important feature of the invention described and claimed in co-pending Patent Application No. 07/348,351, namely that the heads of bolts 22 securing the rasp bars 12 and 13 to the respective weld nuts 21 are located below (as seen in FIG. 13) the lowermost operative surfaces 23 of the rasp bars which are in fact the surfaces between conventional raised fins or rasps 24, 99 of the rasp bars. Thus, the heads of the bolts 22 are not contacted by crop material in operation of the combine harvester and are thus not subjected to abrasive wear which is the case with existing designs resulting, in many instances, in making it impossible to remove bolts by applying a spanner to the heads thereof in view of the severe wearing away of the latter.

Looking in greater detail at the leading rasp bars 12, each is provided with a lead-in or ramp portion or ramp 25 which will be seen from FIG. 13 of the drawings to extend to the periphery of the associated rotor 1 along its entire forward edge in order to close the gap between the rasp bar and the rotor so that there is no likelihood of crop material becoming trapped therein and building up so as eventually to plug the rotor. The lead-in portion 25 of each leading rasp bar 12 is smooth and the fins or rasps 24 are provided along the upper edge of this lead-in portion. Each rasp bar 12 is provided with two apertures 26 to receive the securing bolts 22, these apertures being provided through portions of the finned area of the rasp bar. In order to compensate for this diminution of the operative portion of the rasp bars 12, the fins 24 are extended forwardly at 24' in the area of the apertures 26 as best seen in FIGS. 9 and 19 of the drawings.

In order to mount a leading rasp bar across a pair of mounts 14, it is necessary merely to offer the rasp bar to these mounts and apply bolts 22 through the apertures 26 in the rasp bar and tighten the bolts into the respective weld nuts 21. In order to assist in the basic location of a rasp bar 12, the latter is provided with a pair of extensions 27 on the back of the lead-in portion 25, which extensions are received in respective indentations or dimples 28 in the adjacent edge of each mount 14. In this respect, each of the opposed and narrower sides or edges of the mounts 14 are provided with such an indentation or dimple 28 in order to avoid the need to ensure that a mount is the correct way round before attaching it to the rotor main body 4. The indentation 28 receiving one of the extensions 27 of a rasp bar 12 moreover provides an impact surface for more direct transfer of crop material impact forces on the lead-in portion 25 of the rasp bar 12 to the mounts 14. As such, less shearing forces are to be expected in the bolts 22 securing the rasp bars 12 to the mounts 14.

Turning now to the trailing rasp bars 13, these are of a different shape from the leading rasp bars 12, primarily because they do not require to have a lead-in portion and thus they comprise a basic rasp bar body provided with fins or rasps 29 and again, emphasis is laid on the fact that the rasp bars 13 are of a greater overall depth than conventional rasp bars in order that the heads of the bolts 22 can be located below the surfaces 23 in between the fins 29.

Figure 6:
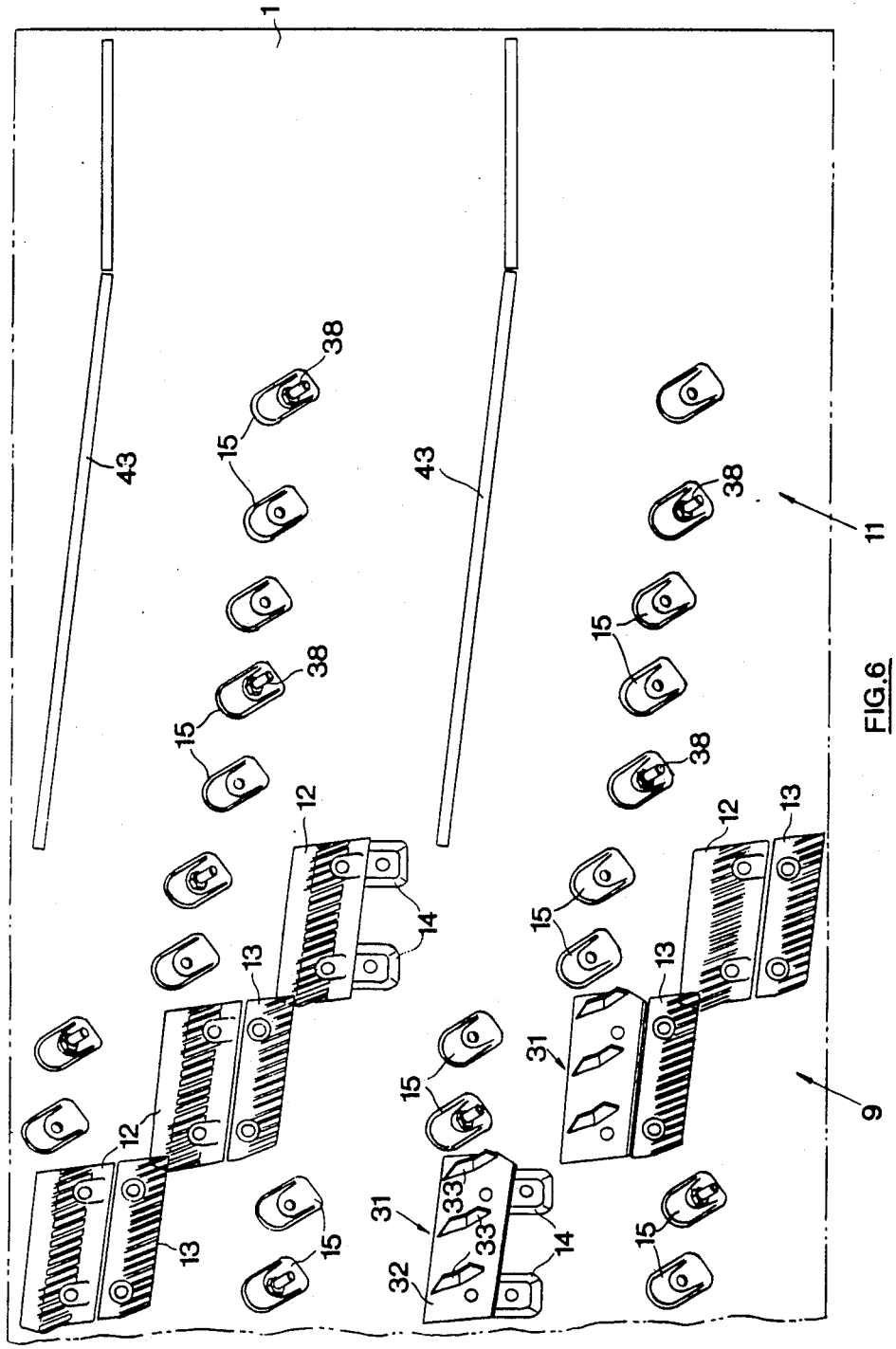
FIG. 6 is a development of the rotor of FIG. 2 showing illustrative arrangements of different members for operating on crop material.

As seen in FIGS. 6 and 19 of the drawings, the trailing rasp bar 13 of one pair of rasp bars 12, 13 is arranged to overlap, both axially and circumferentially of the rotor, the leading rasp bar 12 of an adjacent pair of rasp bars. The rear edge of each trailing rasp bar 13 is cut away at 30 in order to accommodate therebeneath the leading rasp bar 13 of an adjacent pair of rasp bars 12, 13 staggered axially of the associated rotor 1. This double overlapping of adjacent leading and trailing rasp bars 12, 13 ensures that there are no gaps which could otherwise trap crop material and cause hesitation of crop flow, possibly leading to eventual plugging of the rotor. Rasp bars have normally been a substantially regular rectangle, as seen in plan view, with the result that the front and rear edges thereof have been extending generally diametrally of the associated rotor 1 as shown in chain lines at 40 in FIG. 19. However, the present rasp bars 12 and 13 are of a more parallelogram form, as seen in plan view whereby the forward and rearward edges are inclined to a diametral plan of the rotor 1 so as to extend more concurrent with the direction of the flow V of crop material.

Accordingly, the helical path of crop material over and across the rotor 1 is less disturbed by the front edge of the parallelogram type rasp bars 12, 13 than with the conventional substantially rectangular rasp bars used until now. The foregoing particularly can be observed at the transition area between the infeed section 5, 6 and the threshing section 9 of the rotor 1. Referring to FIG. 19, it can be seen that the free space between the auger flights 7 at the discharge end of the infeed section 5, 6 is almost fully closed off by the conventional rectangular rasp bars, obstructing a smooth takeover of crop material presented to the threshing section 9. In contrast therewith and due to the parallelogram form of the rasp bars of the present invention, the transition area is freed to some extent ensuring a smoother flow of crop material from the infeed section 5, 6 to the threshing section 9.

As illustrated in FIG. 6 of the drawings, the provision of permanent mounts 14 and 15 for crop operating elements enables the format of a given rotor to be modified in order to suit various crop types and crop conditions as further described in the co-pending Patent Application referred to above. The arrangement illustrated in FIG. 6 of the drawings is merely by way of giving examples of the different types of crop operating members which may be employed and does not necessarily illustrate one format of rotor which may be used. As regards the mounts 14, it will be seen that these may be fitted with rasp bars 12 and 13, as already described, although one or more leading or trailing rasp bars may be omitted if desired in order to reduce the threshing action which is usually desirable when harvesting beans, for example. Alternatively, one or more leading rasp bars 12 may be replaced by a crop operating element 31 (FIG. 18) which is a composite thinning element in the sense that it serves to cut or thin the mat of crop material prior to it being threshed in order that the threshing operation can be optimised. The thinning elements 31 comprise a base plate 32 on which a plurality of blades 33 are mounted which have a lead-in edge 34 and a generally V-shaped top edge 35. It will be appreciated that other types of thinning elements may be provided as required.

As best seen in FIGS. 16 and 17, the further mounts 15 also comprise an arcuate base 36 which, as with the base 16 of the mounts 14, conforms to the periphery of the associated tube 4 of the rotor 1. As seen in plan view, this base 36 of each further mount 15 is also an elongated rectangle and is provided with an actual mounting surface 37 for a crop operating member in the form of a thinning rod 38 which is threaded at one end in order to be received by a weld nut 39 provided on the underside of the mounting surface 37 in alignment with an aperture 41 therein. The thinning rods 38 need to be mounted both so as to trail with respect to the direction of rotation of the associated rotor 1 and also to point towards the rear end of the rotor. Thus, the mounting surface 37 is inclined in two planes and in the illustrated embodiment the inclination in one plane is such as to impart a trailing angle of 30° for each thinning rod 38, and an angle of 32° towards the rear end of the rotor.

The thinning rod 38 is inclined rearwardly with an angle of 30° when seen in the direction of rotation and with respect to the radius of the rotor 1 passing through the bottom end of said thinning rod 38, as seen in FIG. 16. The angle of 32° is the angle between the longitudinal axis of the further mount 15 and the diametral plane of the rotor which that axis meets, as illustrated in FIG. 17. It should be appreciated that these angles of 30° and 32°, though of primary importance, are not critical. Each thinning rod 38 is provided with an hexagonal flange 42 immediately adjacent the threaded end portion in order that a spanner can be used to mount and dismount the rod in a mount 15. In this respect, a socket spanner can be used which is particularly advantageous in cases where the separating concaves are not removable because it is possible to mount and dismount the thinning rods through the mesh of those concaves which is a distinct advantage. Otherwise, the rotor 1 and/or casing 2 has to be removed for servicing said thinning rods. In machines where the separator concaves are hingedly attached to the rotor casing 2, then there is no problem in this respect. It is normal to provide removable threshing concaves.

As already mentioned, and as seen in FIGS. 2, 3 and 6, a number of further mounts 15 are disposed around the periphery of each rotor 1 and FIGS. 3 and 6 show the provision of thinning rods 38 on some of these mounts and not on others. Again, the illustrated arrangement in this respect is merely by way of example but serves to show that a desired format of thinning rods can be used without any fear of the unused mounts 15 interfering in any way with the flow of crop material because, as with the mounts 14, the further mounts 15 have a low profile and rounded edges. In the separating section of each rotor 1, there are also provided conventional separate bars 43 as well as a number of further mounts 15.

The axial overlapping of adjacent threshing means, as opposed to axial staggering thereof, in accordance with the present invention has been found to help considerably in providing an optimum threshing configuration for smooth crop flow, low grain loss, minimum crop damage, and lower power consumption. With crops having long straws, the present invention results in less hesitation in crop flow, less crop "hits" (thus reducing hammering which can cause great operator discomfort) and a greater operating efficiency. The overlapping threshing means also provides a smoother transition between staggered mounting means with a reduced catching or trapping of crop material in the transition area. Indeed, when the conventional rectangular rasp bars are employed, which are staggered but not overlapping, a "hairpinning" effect is to be expected, which means that long straw crops, and especially the larger head portions thereof, have a tendency to get pinched in the gap or V-pocket inbetween two adjacent staggered rasp bars, causing the straw to be pulled diametrally of the rotor in stead of following a spiral path for optimum crop flow. Also, the front edge of the conventional rectangular rasp bars form an obstruction for the spiral flow of crop material. This rasp bar "end effect" is greatly reduced by the parallelogram form of the present rasp bars which provides a rasp bar front edge more aligned with the spiral path of the crop relative to the rasp bars.

It will be understood that changes in the details, materials, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form.

We claim:

1. In an axial flow harvesting machine having at least one generally cylindrical rotor defining a generally longitudinally extending axis and being rotatably mounted within a casing and operable, in conjunction with the casing, to thresh and separate grain from straw material, and a plurality of threshing means provided around the periphery of said at least one rotor and being staggered axially thereof, the improvement comprising:

said adjacent threshing means overlapping with respect to the axis of said at least one rotor.

2. The harvesting machine of claim 1, wherein said adjacent threshing means are also arranged to overlap circumferentially on said at least one rotor.

3. The harvesting machine of claim 1, wherein said threshing means are in the form of pairs of leading and trailing rasp bars, the trailing rasp bar of each respective part of rasp bars overlapping the leading rasp bar of an adjacent pair of rasp bars both axially and circumferentially along said at least one rotor.

4. The harvesting machine of claim 3, each said trailing rasp bar has a rear edge cut away to accommodate the adjacent leading rasp bar therebeneath.

5. The harvesting machine of claim 4, wherein each said leading and trailing rasp bar has a generally parallelogram form as seen in plan view and mounted on said at least one rotor at an angle inclined to the axis thereof, whereby the front and rear edges extend generally diametrally of said at least one rotor.

6. The harvesting machine of claim 5, wherein the mounting means are separate detachable from said at least one rotor.

7. The harvesting machine of claim 6, wherein said mounting means are in the form of indentations in said at least one rotor.

8. The harvesting machine of claim 6, wherein said mounting means are in the form of raised mounts affixed to the circumferential surface of said at least one rotor.

* * * * *